F. G. SPEAR.
EGG BEATER.
APPLICATION FILED JAN. 10, 1911.
1,019,546.
Patented Mar. 5, 1912.
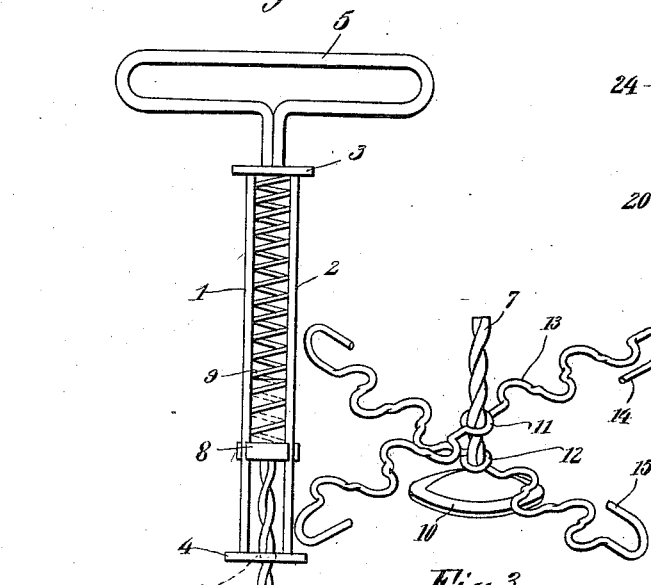
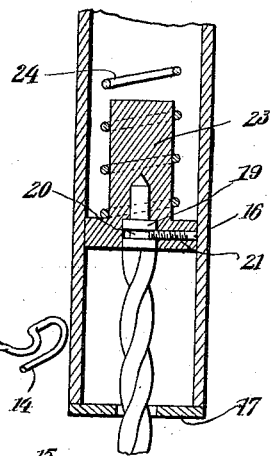
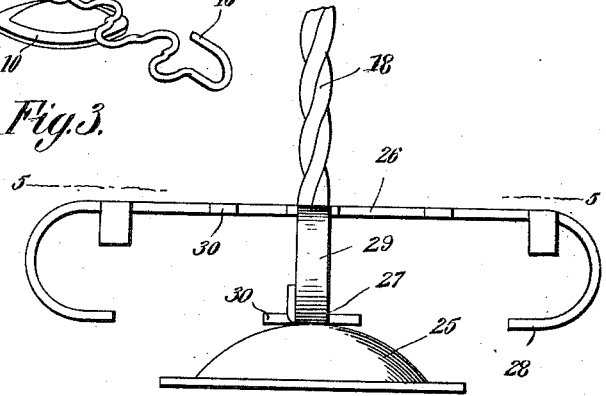
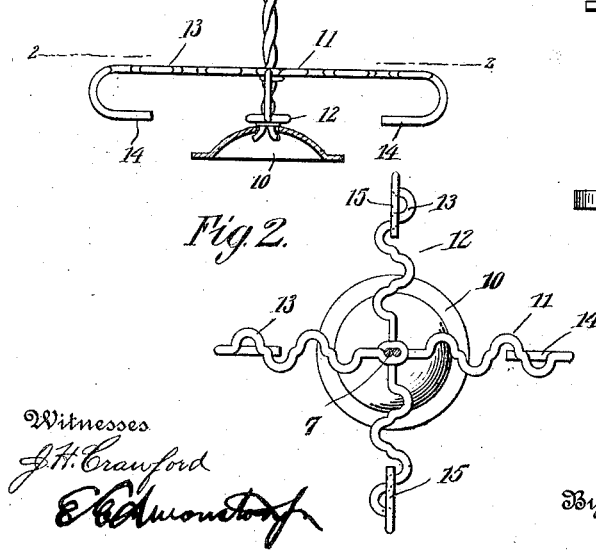
Inventor
Fannie G. Spear.
Witnesses
J. H. Crawford
E. C. Edmondson
By Victor J. Evans
Attorney

UNITED STATES PATENT OFFICE.

FANNIE G. SPEAR, OF NEW YORK, N. Y.

EGG-BEATER.

1,019,546. Specification of Letters Patent. Patented Mar. 5, 1912.

Application filed January 10, 1911. Serial No. 601,821.

*To all whom it may concern:*

Be it known that I, FANNIE G. SPEAR, a citizen of the United States, residing at New York, in the county of New York and State of New York, have invented new and useful Improvements in Egg-Beaters, of which the following is a specification.

This invention relates to egg beaters and one of the principal objects of the invention is the provision of a simple, thoroughly efficient and inexpensive beater which may be operated with one hand and which will break up the egg material in the shortest space of time.
A further object of the invention is the provision of a device of this character having means which will cause its wings to rotate in alternate directions with each complete cycle of movement of the handle and whereby the power of a spring is stored up in one movement of the handle and utilized to turn the wings in the opposite movement.

Further objects of the invention will appear as the following specific description is read in connection with the accompanying drawing, which forms a part of this application, and in which:—

Figure 1 is an elevation, partly in section, of my improved form of egg beater. Fig. 2 is a section taken on the line 2—2 of Fig. 1. Fig. 3 is a detail perspective view of the lower end of the device. Fig. 4 is a detail elevation, partly in section, of a modified form. Fig. 5 is a horizontal section taken on the line 5—5 of Fig. 4, and on a somewhat reduced scale.

Referring more particularly to the drawing, 1 and 2 represent separated uprights or guiding bars which are connected together at their ends by the plates 3 and 4. The upper plate has connected to it a handle 5 and the lower plate is provided with a slot 6 in which is slidably mounted a twisted wire shaft 7. This shaft is journaled, at its upper end, in a sliding guide 8 which is slidably mounted upon the guides 1 and 2. A spiral spring 9 is secured at its lower end to the guide 8 and at its upper end to the plate 3 and is compressed with each downward movement of the handle 5, so that when it expends the handle is raised upon the shaft and the shaft given a rotary movement in the slot 6 in opposition to its movement on the down stroke of the handle. The lower end of the shaft 7 is journaled in a base piece 10 in such a manner as to permit lateral movement of the handle without tilting the base piece upon the bottom of the receptacle upon which the beater is operating.

Secured to the lower end of the shaft, immediately above the base piece 10, are the beater wings 11 and 12 which are separated and which comprise independent strips or strands of wire of sufficient strength and preferably of some material which will not rust or corrode. Each beater is wrapped around the shaft and secured thereto in any suitable manner, as by soldering, its free ends extending laterally of the shaft in opposite directions and having the compound curves 13 therein. The ends of the wing 11 are turned downwardly and inwardly, as at 14, while the ends of the wing 12 are turned upwardly and inwardly, as at 15. The beater wings 12 are located as close to the bottom of the device as is possible and have their ends 15 turned up so as to lie in a plane with the beater wings 11 and the ends 14 of the beater wings 11 are turned downwardly to lie in a plane with the beater wings 12. These members, when arranged as shown and operated in the manner heretofore described, will form a vortex in which the lower wings will raise the egg material while the upper wings will depress the material so that the greatest possible agitation of the material may be had.

In the modification shown in Figs. 4 and 5 the cylinder 16 is shown as provided with a bottom plate 17 through which the spiral shaft 18 is passed. The upper end of the spiral shaft has connected to it a head 19 which is grooved at 20 so as to receive the set screw 21 which holds it in the sliding block 23. This block is held in depressed position in the cylinder by the spring 24 which is connected at its upper end in the cylinder in the manner shown in Fig. 1. The lower end of the spiral or twisted shaft 18 is journaled in a base piece 25 in a similar manner to that shown in Fig. 1 and carries immediately above the base piece the wing members 26 and 27. These wing members are constructed of strips of metal which are bent into hooks at their outer ends as shown at 28 and 29, the hooks 28 bending downwardly and inwardly and the hooks 29 bending upwardly and inwardly, in a similar manner to the ends 14 and 15 of the wing members 11 and 12. Each of the wing members 26 and 27 is provided throughout its length with laterally extending agitating ears 30 the outer ones of which on the wing member 26 are bent downwardly while the outer ones on the wing member 27 are bent upwardly. This construction is adapted to act so that the material will be picked up, from the bottom of the receptacle in which the device is operating, by the lower wing member 27 and thrown upwardly and then engaged by the wing member 26 and thrown downwardly. This operation causes the greatest possible agitation of the material and produces from the egg material a finely divided foamy product which cannot be produced where the structure tends to constantly raise the egg material, even though the wings are located in opposite directions.

It will be noted that the device has few parts and is therefore comparatively cheaply made and is readily cleansed, which makes it particularly advantageous.

Having thus described the invention, what I claim as new is:—

1. In combination, a base piece, a spiral shaft journaled therein, a spring retracted operating means for rotating said shaft in alternate opposite directions, and oppositely disposed beater wings secured on said shaft in different planes and in fixed relation one to the other.

2. In combination, a supporting base, a spiral shaft having one end journaled therein, a slotted frame slidably mounted on said shaft, means for operating the same, a head journaled on the opposite end of the shaft and slidably mounted in the frame, a retracting spring interposed between the head and the frame for raising the frame on the shaft, and right angularly and oppositely disposed beater wings secured to the shaft in different planes and in fixed relation one to the other.

3. In an egg beater, a shaft, means to rotate said shaft in alternate opposite directions, a pair of separated beater wings secured at right angles to each other in fixed relation, one of the said beater wings having downwardly and inwardly turned ends, and the other beater wing having upwardly and inwardly turned ends.

4. In an egg beater, a shaft, means to rotate said shaft in alternate opposite directions, a pair of separated beater wings secured on the shaft at right angles to each other in fixed relation, one of said beater wings having downwardly and inwardly turned ends, and the other beater wing having upwardly and inwardly turned ends, and means on the upper beater wing for forcing the material operated upon downwardly, and means on the lower wing for forcing the material upwardly.

In testimony whereof I affix my signature in presence of two witnesses.

FANNIE G. SPEAR.

Witnesses:
LOTTIE E. WALTERS,
E. EDMONSTON, Jr.